United States Patent

Sullivan

[15] 3,695,462
[45] Oct. 3, 1972

[54] BAGGAGE HANDLING SYSTEM

[72] Inventor: Norman M. Sullivan, Grand Rapids, Mich.

[73] Assignee: Rapistan Incorporated, Grand Rapids, Mich.

[22] Filed: Aug. 28, 1970

[21] Appl. No.: 67,738

[52] U.S. Cl. .............. 214/16 B, 214/311, 214/307, 214/11 R
[51] Int. Cl. .............................. R65g 43/00
[58] Field of Search ............... 214/11 R, 16 B, 311

[56] References Cited

UNITED STATES PATENTS

3,260,349  7/1966  Vander Meer .......... 214/11 R

Primary Examiner—Gerald M. Forlenza
Assistant Examiner—R. Johnson
Attorney—Price, Heneveld, Huizenga & Cooper

[57] ABSTRACT

A baggage handling system utilizing four-sided open top containers each carrying only one owner's set of baggage from the check-in to the enplaning dispensing station, and from the deplaning loading station to a baggage claim area. The system contemplates, in one form, that delivery of the baggage to the baggage claim area will occur only at the initiation of the baggage owner. A coded signal comprising a baggage identification number or in the case of a dispensing station, a flight number, is fed to a computer which compares the information in the signal with the contents of the container, pulls the appropriate container out of the container system, and causes it to discharge at the point where the coded signal was generated. The containers are located by the computer by means of a memory system which has been supplied the identity of each individual container and which at all times can determine the precise location of each individual container in the system. When the system is used for returning baggage to its claimant, the claimant provides a reader at the baggage claim station with a code identifying his particular baggage which enables the computer to direct the container having his baggage to the claimant and to discharge it to him.

34 Claims, 33 Drawing Figures

PATENTED OCT 3 1972 3,695,462

INVENTOR.
NORMAN M. SULLIVAN
BY Price, Heneveld
Huizenga & Cooper
ATTORNEYS

INVENTOR.
NORMAN M. SULLIVAN
BY
ATTORNEYS

INVENTOR.
NORMAN M. SULLIVAN
BY
ATTORNEYS

BAGGAGE HANDLING SYSTEM

BACKGROUND OF THE INVENTION

The conventional baggage handling systems such as utilized at airports are reaching the point of total inadequacy. The lack of automation and the need for manual assistance with and control over the bags which are deplaning, have resulted in long delays for passengers desiring to claim their bags. In addition, inasmuch as all of the bags are discharged at an apron or pickup point regardless of the presence of the owner, theft of unattended bags has become a serious problem. The attendants who are discharging the bags to the apron or pickup points are invariably too busy to insist that claimers produce their baggage check so as to verify ownership. Theft becomes a particularly acute problem in those cases in which for some reason or other the baggage does not come in on the same plane as the passenger, requiring the passenger to return at some later time to pick up the bag. In the interim, the bag remains on the apron in the obvious absence of its proper claimant, thus inviting theft.

At the initiating or enplaning end of the process, the lack of automated means for dispensing the bags to the proper plane is a source of error inasmuch as many conventional systems require an individual to read correctly the baggage checks on the bags to ascertain to which flight the bags are to be dispatched. While a substantial advance in resolving this problem was effected by the system disclosed in U.S. Pat. No. 3,260,349, this invention substantially improves upon that advance.

Still another problem concerns the containers heretofore developed for delivering articles to various stations. In the art of mail sorting, containers have been constructed with door operating mechanisms which push against the container contents prior to their unlatching. See, for example, the containers disclosed in U.S. Pat. No. 3,463,298. Such containers are not reliable for the delivery of heavy articles such as baggage because the weight of the baggage may jam the door operating mechanism.

SUMMARY OF THE INVENTION

This invention relates to an automated system for delivering deplaning baggage to the customer or passenger only on his demand and only upon the presentation of his baggage check. This system also provides more automated dispatching of the baggage at the enplaning end. Specifically, the invention provides in a conveyor system for baggage having a plurality of containers and conveying means for transporting the containers, the conveyor system having at least one discharge station. The system is so equipped that it can automatically identify the contents of the containers and cause those of the containers having contents which are designated for the station to discharge at the station in response to the reading of a signal which is associated with the container. The system further includes means for re-encoding the container as containing new contents when baggage is first inserted into empty containers, and means for transporting the empty containers from the discharge station to the loading station for refilling. The system also includes means for locating the containers bearing the contents identified in the signal generated at the discharge station, and means for storing the containers with their contents therein, the locating means being directed at least to the storing means for locating the pertinent container. Also included are means for retrieving the containers from the storing means upon the finding by the comparing means of identification information compatibility. For the discharging of a container, there are included means for inclining the container at an angle to the horizontal at a discharge station, means for releasing the door on the container at the discharge station, and means for selectively closing the door when the container has discharged its contents.

Accordingly, it is an object of the invention to provide an improved baggage handling system which will provide delivery to the deplaning passenger only upon his demand and proof of ownership.

It is another object of the invention to provide a baggage system of the above character wherein the delivery of the baggage is automated so as to eliminate delays inherent in manual handling.

It is a further object of the invention to provide a baggage system of the above character wherein lost baggage is reduced to a minimum.

It is a related object to provide a baggage container for use in the above system which has a fixed identity that is associated temporarily with the baggage it carries, and which is capable of being caused to automatically deliver its contents on demand to the baggage claimant.

It is yet another object of the invention to provide an improved baggage conveyor wherein the automatic door opening mechanism on the baggage container is simplified in construction and is not susceptible to jamming due to heavy loads.

Other advantages and objects will become apparent upon reference to the following drawings and detailed discussion.

DESCRIPTION OF THE PREFERRED EMBODIMENTS

The disclosure provides a baggage handling system such as is utilized in an airport wherein baggage is checked in, delivered to a loading area where the bags are loaded on carts or baggage containers and transported to the plane, the airport having a loading area for bringing in deplaning bags for distribution to baggage claim areas. Specifically, the invention concerns an improvement of that system, the improved system illustrated in FIG. 1 being representative for illustrating purposes only. Other layouts may be utilized, such as a layout wherein the dispensing station for loading the baggage onto the airplanes is not located adjacent to the deplaning loading area at which baggage is received from planes to be distributed to baggage claim areas.

The system, in the form illustrated, has a powered conveyor system 10. The conveyor transports specialized containers 60, the containers being carried by conventional conveyor belts or conventional conveyor means from one location to another. At the check-in area 20 (FIG. 1), baggage is loaded into empty containers or trays waiting in line, each bag bearing conventional identification information such as destination and flight numbers. It may, in the more sophisticated forms of this invention, also include additional identification such as the passenger's ticket number. To code the identification into the system at station 20, coding and dispatching units 22 are provided. If the departure time for the flight is within a predetermined time, such as within one hour from the entry of the container for that baggage into the system, the container is switched to a through track 29 which passes through the storage area. The container is then carried to a baggage sorting and dispensing station 30 wherein the baggage is discharged into bin slides 32 in a manner hereinafter described. If the departure time is more than the predetermined period after it has entered the system, the container is shunted to storage conveyor 32 at the end 34 thereof, so that each new storage adds to the contents of the storage area one at a time. As the departure time approaches, the tray or container is automatically located in the storage area on the conveyors 32 and retrieved therefrom onto the through conveyor 29 so as to be carried to the sorting and dispensing station 30. The remaining stored containers are indexed down one position at a time from their previous positions. Once sorted, the baggage is placed on conventional carts 36 and carried to the plane.

Figure 1:
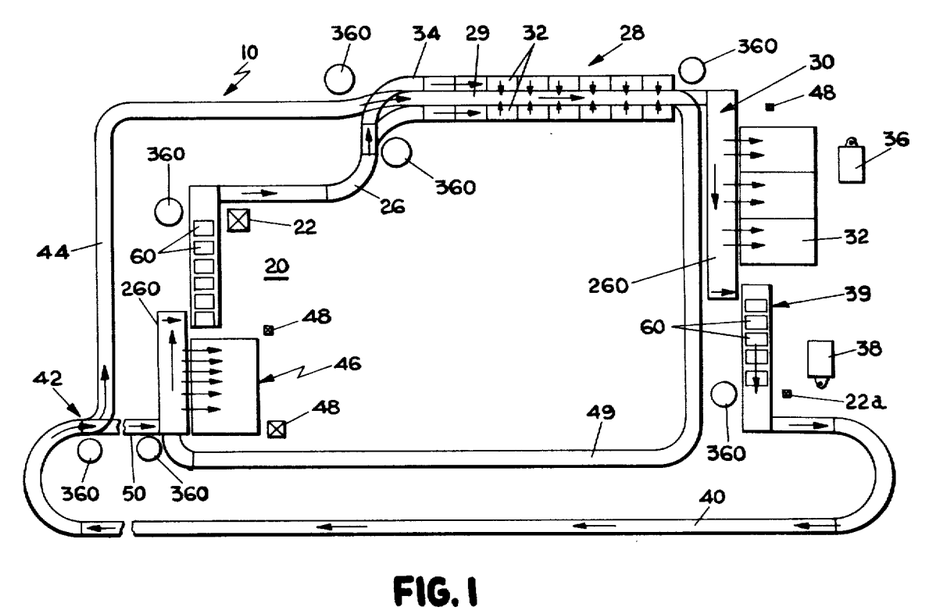
FIG. 1 is a schematic diagram of one possible floor plan layout of the baggage system as it might be utilized in a representative airport.

At the other end of the process, baggage is brought from the plane on a cart 38 and the identifying information on the baggage check is coded into the system by means of the coding unit 22a, this unit being otherwise identical with unit 22 at the check-in station 20. As the tray is loaded with baggage from the plane, the identity of the claimant is fed into the computer which associates this information with the identity of the tray. The identity of the claimant may be his ticket number or any other suitable means of identification. The tray or container with the deplaning baggage is then carried by a conveyor 40 to a switch location 42. A conventional high speed transport conveyor moving, for example, at approximately 20 miles per hour can be utilized for the conveyor 40.

When the loaded tray reaches the switching location 42, if no demand has been made for that particular baggage, the tray or container is shunted to the conveyor track 44 which carries the container into the storage area 28 as described for the enplaning baggage. To receive the baggage check of the passenger at the baggage claim area 46, baggage call units or receptors 48 are provided, which baggage call units each direct a coded signal into the system which signal is compared with the identifying information already supplied the computer. If there is a compatability between that identity and the signal, the container is sent directly to the baggage claim area, or if in storage is called out of storage 28 and delivered to the baggage claim area 46 by means of the high-speed conveyor track 49. At the area 46, the container discharges its contents to the customer. If the call is made by the units 48 prior to the container reaching the switching area 42 via conveyor 40, the container can be switched to conveyor track 50 so as to be brought into the baggage claim immediately. Trays or containers emptied in the baggage claim area are either returned to the loading area for deplaned baggage or shunted into the enplaning area 20 for use by the check-in station.

THE CONTAINER

Figure 7:
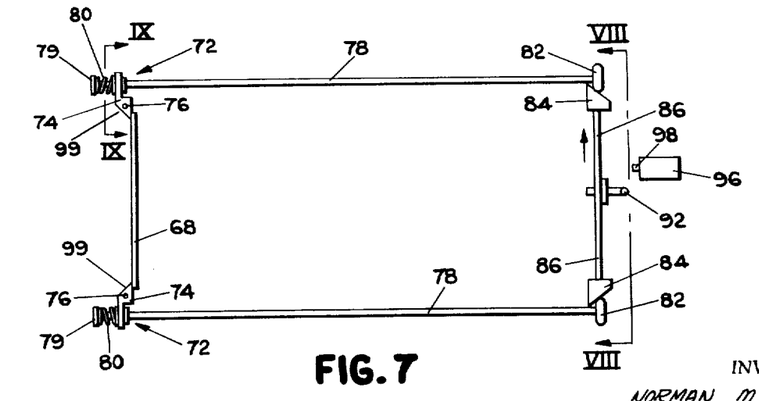
FIG. 7 is a schematic illustration of one embodiment of the opening mechanism for the container illustrated in FIG. 5.
Figures 8, 9, 10, 11, 12, 13:
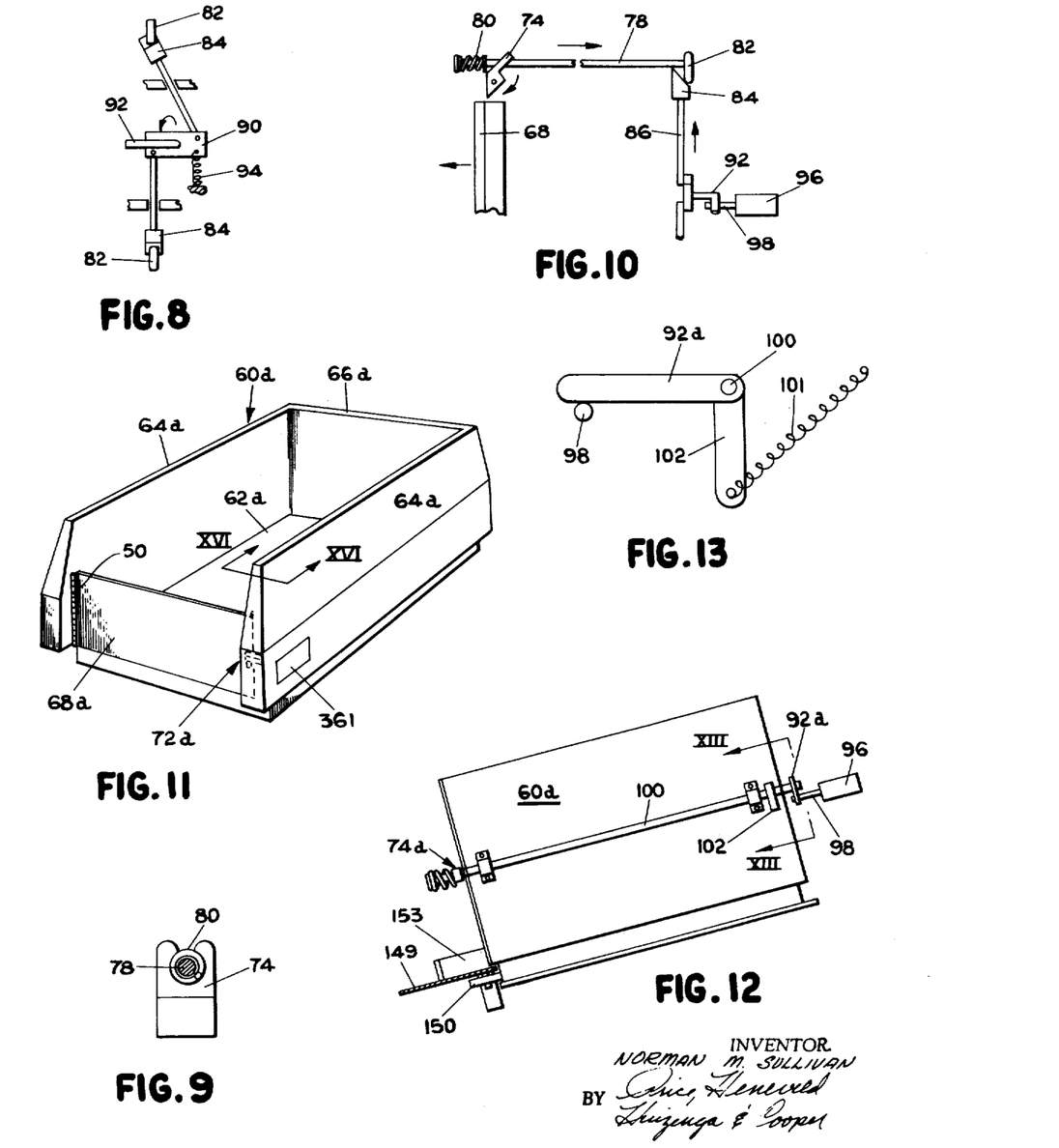
FIG. 8 is an end elevational view taken along the lines VIII—VIII of FIG. 7.
FIG. 9 is a sectional view taken along the lines IX—IX of FIG. 7.
FIG. 10 is a fragmentary enlargement of the schematic view illustrated in FIG. 8, with the parts occupying the opened position.
FIG. 11 is a perspective view of an alternate embodiment of the container illustrated in FIG. 5.
FIG. 12 is a side elevational view of the embodiment of the container illustrated in FIG. 11 with the exterior of the container side wall removed.
FIG. 13 is a fragmentary sectional elevational view taken along the plane XIII—XIII of FIG. 12.

Having described the novel system, the novel container which makes this possible can be set forth. As illustrated in FIGS. 5 through 10, it comprises a four-sided tray 60 which is upwardly open. It has a bottom or floor 62, two generally vertically extending side walls 64 and an end or back wall 66. The sides and back can be made of any suitable material such as a formed plastic or fiberglas. It also has a door 68 which, along with the floor 62, can be metal, the door 68 being hinged at 70 and held closed by a latch mechanism 72 at both sides of the door 68 (FIGS. 7, 8 and 10). The latch mechanism 72 comprises a latch 74 pivotally hinged at 76 to the walls 64 and slidably engaging a rod 78. To bias the latch 74 so as to move with the rod 78, yet permit the door 68 to close, a compression spring 80 is provided between the ends 79 of the rod 78 and the latch. This provides a limited lost motion connection. The rod 78 is movable within the side walls 64 and is reciprocated by a cam 82 at the end of each rod, the cam being actuated by a wedge 84 positioned on the end of actuating rods 86 located on or in the back wall 66. The rods 86 are attached on a pivot plate 90 having a finger 92 projecting therefrom. A tension spring 94 having one end secured to the back wall 66 biases the pivot plate 90 into the vertical position. An actuating solenoid 96 in the path of travel of the container at a discharge station engages the finger 92, rotating the pivot plate 90. This forces the cams 82 to shift rearwardly releasing the door 68. The solenoid has a normally retracted trigger 98. When attached, the trigger shifts to extended position where it engages the finger 92. The latches 74 having camming surfaces 99 formed on the front faces to facilitate closing of the door 68. The springs 80 provide sufficient lost motion for the latches to allow them to pivot out of the way when the door is being shut. The door closing mechanism is hereinafter described.

FIGS. 11, 12 and 13 illustrate an alternate embodiment of the latching mechanism for the container or tray carrying the baggage. The parts in these embodiments which correspond to those previously described have the same reference numerals to which the distinguishing suffix a has been added. In this construction, the door 68a is mounted to one of the side walls 64a by a hinge 50 and latched to the other side wall 64a by a latching mechanism 72a. The latching mechanism comprises a latch finger 74a mounted on one end of a rod 100 rotatably supported inside the wall 64a. The other end of the rod 100 mounts a camming finger 92a which serves the same purpose as the finger 92. The finger 92a is so positioned that it will be pivoted by the extended trigger 98 of the solenoid 96 in the manner described for the embodiment illustrated in FIGS. 7 and 8. The trigger pivots the finger to rotate the latch 74a downwardly, releasing the door 68a to swing outwardly on its hinge.

The latch is biased into closed position by a spring 101 mounted within the back wall of the container (FIG. 13). One end is fixed to the container and the other to the lever 102 secured to the rod 100. To permit the door to be closed after the latch has returned to its normally closed position, the latch finger 74a can be provided with the same spring and lost motion connection illustrated in FIG. 7. It will be obvious that various other latch arrangements to effect the same result may be utilized within the teaching of this invention.

Figure 15:
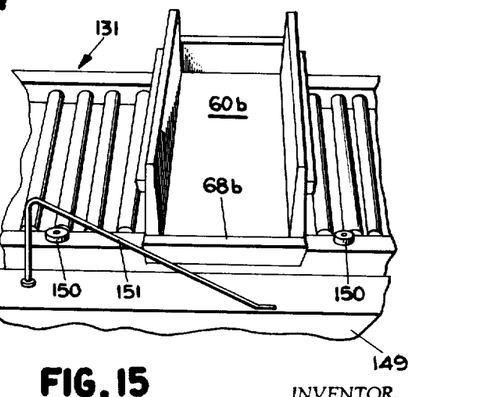
FIG. 15 is a top perspective view of yet another alternate embodiment of the baggage container and illustrating the door closing mechanism.
Figure 16:
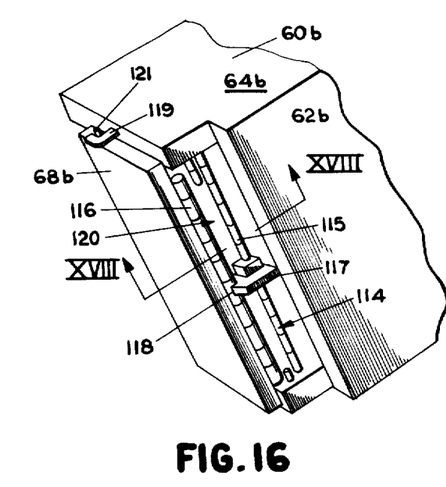
FIG. 16 is a bottom perspective view of the embodiment of FIG. 15.
Figure 17:
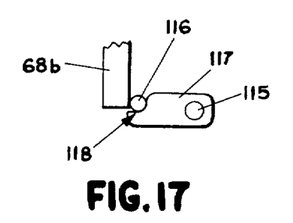
FIG. 17 is a sectional elevation view taken along the plane XVIII—XVIII of FIG. 16 showing the door in normally closed position.

In the embodiment illustrated in FIGS. 15, 16 and 17, the door 68b of the tray 60b is hinged to the floor 62b as in the case of the first described embodiment, but a different latching mechanism is utilized. The door 68b is connected to the floor 62b by a double-acting hinge 114 comprising hinges 115 and 116 mounted on the floor and the door, respectively, the two hinges being joined to each other by the plate 120. A release bar 117 pivots about a portion of the hinge 115, the bar having a nose 118 which projects under the hinge 116. When the bar 117 is pivoted about the hinge 117, the nose 118 presses against the undersurface of the hinge 116, forcing the hinge upwardly, lifting the stops 121 on the door 68b off the latches 119 projecting from the front of the sides 64b of the tray. This action is illustrated in FIGS. 17 and 18.

Figure 19:
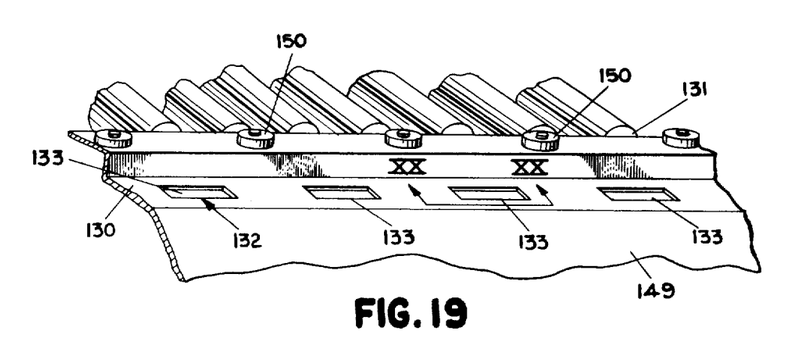
FIG. 19 is a fragmentary, perspective view of the conveyor at a container discharge station.
Figure 20:
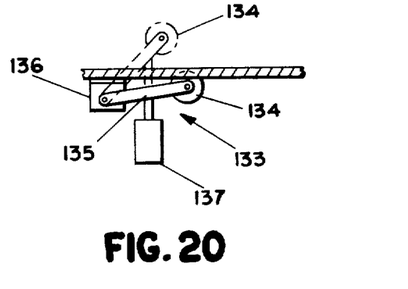
FIG. 20 is a fragmentary sectional elevation view taken along the plane XX—XX of FIG. 19.

FIGS. 19 and 20 illustrate an actuator arrangement suitable for opening the door. The discharge station is provided with a ledge 130 immediately adjacent the conveyor track 131. This ledge 130 is so located that it is directly beneath the door mounting hinges of the containers as they pass through the discharge station. At suitably spaced intervals, such as three feet, the ledge is equipped with slotted apertures 132 in each of which is mounted a trigger 133. The trigger can be designed in several different forms but in the embodiment illustrated it is a wheel 134 rotatably mounted on the end of an arm 135. The opposite end of the arm is pivoted to the bracket 136 secured to the undersurface of the ledge 130. The trigger is extended in raised, operative position (shown in phantom in FIG. 20) by a solenoid 137. The solenoid is connected to and is under the control of the computer.

Figure 18:
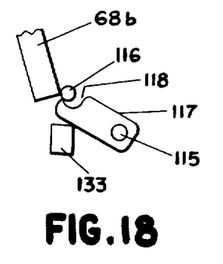
FIG. 18 is a view identical to FIG. 17 but showing the door raised to release position.

When the trigger 133 is raised, it engages the release bar 117, as shown in FIG. 18, thereby pivoting the bar 117 to its raised, door releasing position.

FIGS. 21-24 illustrate a modification of the container door arrangement shown in FIGS. 15-18. The container 60c has the same construction as the container 60b. The door 68c is mounted by means of a double-hinge assembly 140. The hinge assembly has one hinge 141 secured to the door and another hinge 142 secured to the bottom of the container. These hinges are joined by an elongated plate 143. Mounted on the plate 143 is a depending cam bracket 144 each end of which is sloped to form a ramp 145.

The sides of the door are notched at 146 to receive the latches 147. When the trigger 133 is raised, it engages the cam bracket 144, lifting the door 68c sufficiently to disengage the latches 147. Since the container at this point is inclined, the door opens automatically by gravity. The door is provided with a bumper or wear-strip 148 to support it on the baggage slide 149 when open. As an alternative, this strip can be mounted on the baggage slide 149 rather than the door. The same arrangement can be used with any of the doors which open about hinges along their bottom edge.

Figure 28:
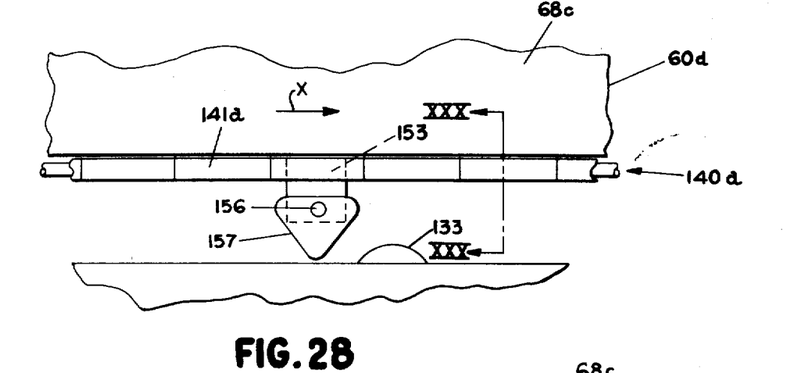
FIG. 28 is a fragmentary enlarged front view of a modified construction of the door hinge arrangement illustrated in FIGS. 16, 22 and 23.
Figure 29:
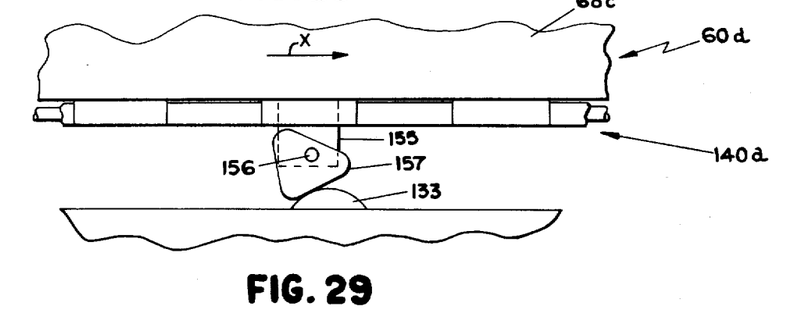
FIG. 29 is a view similar to FIG. 28 showing the hinge actuator in door opening position.
Figure 30:
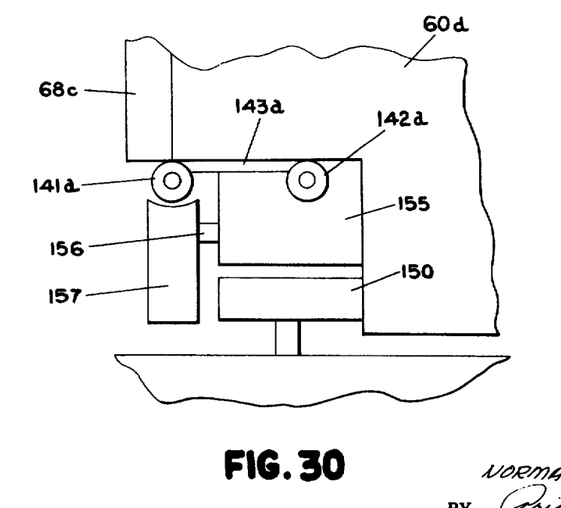
FIG. 30 is a fragmentary sectional view taken along the plane XXX—XXX of FIG. 28.

FIGS. 28–30 illustrate a container 60d having the same door construction as the container 60c illustrated in FIGS. 21–24. The door 68c is mounted by means of a double hinge assembly 140a which includes the hinges 141a, 142a and the joining plate 143a but omits the cam bracket 144. In place of this, the container at the center of the hinge assembly 140a has a reinforcing boss 155 which supports a stud 156. Pivotally mounted on the stud 156 is a rocker cam 157. To permit use of the boss 155, a portion of the hinge 142a and of the hinge joining plate 143a is cut away.

The rocker cam 157 is triangular in shape with its base inverted and closely adjacent the bottom of the hinge 141a. It pivots about a point near its top whereby pivotal shifting of its depending apex will cause one of its corners to engage and push against the hinge 141a.

As the container 60d is moved in the direction of the arrow X (FIGS. 28 and 29), a raised trigger 133 engages the bottom of the rocker cam 157, pivoting it to cause one corner to lift the door 68c to unlatch it. This arrangement has the advantage of applying the full opening force to the door itself thus forcing it to unlatch rather than applying some of the lifting force to the container. This is significant in situations in which the door is jammed or partially jammed by heavy luggage pressed against it. It will be seen that the arrangement permits the wheels 150 which hold the container on the conveyor to pass beneath the boss 155 and between the rocker cam 157 and the recessed front face of the container.

It will be recognized that this mechanism is bidirectional. The rocker cam will function effectively to open the door 68c whether the container is moved to the right or to the left.

It will be recognized that the tray constructions illustrated in FIGS. 15–24 and FIGS. 28–30, while shown and described as providing a door at one end only of the try, permit the tray to be designed with identical door arrangements at both ends of the tray to satisfy the requirements of installations needing such. Another advantage of the construction shown in these figures is the fact that the tray is capable of operation with the same door opening and closing devices irrespective of the direction of approach to the door opening devices. The door closing device 151 (FIG. 15) can be adapted to bi-directional operation simply by making it with two oppositely directed sloping door engaging cams thus forming an isosceles triangle.

THE DISCHARGE STATION

Figures 4, 5, 6:
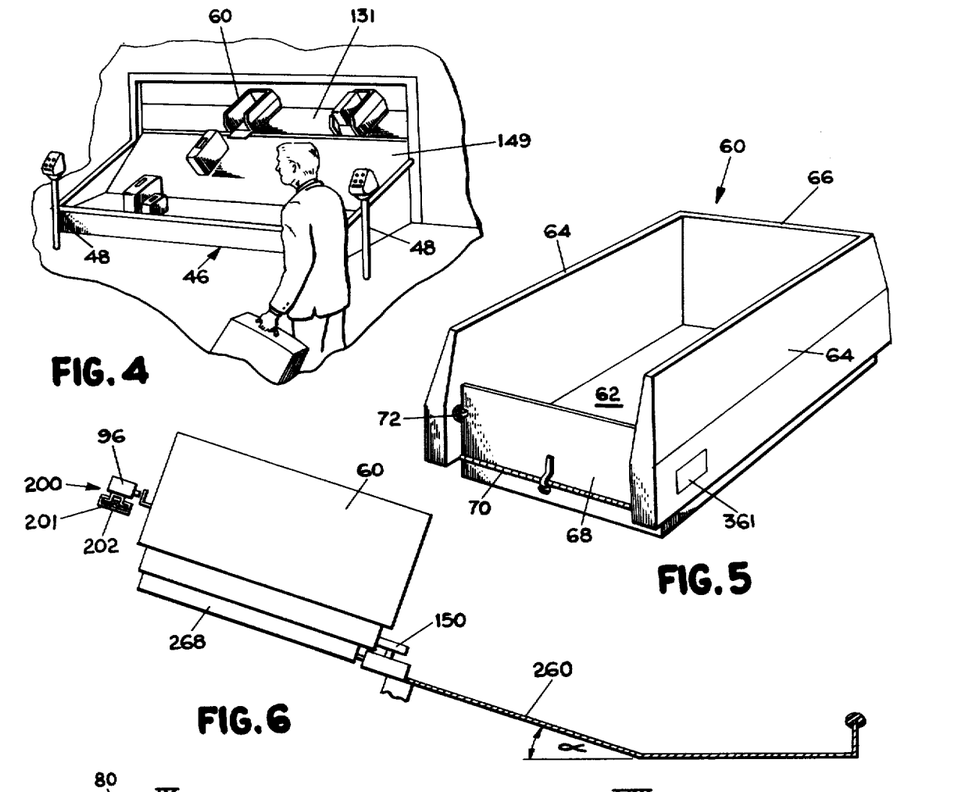
FIG. 4 is a perspective view of the baggage slide at a baggage claim area.
FIG. 5 is a perspective view of one of the containers constructed in accordance with the invention.
FIG. 6 is a side elevational view of a discharge station.

To cause the container to discharge its contents at either the sorting and dispensing station or the baggage claim area, the container is inclined at an angle to the horizontal at those points of discharge with the door positioned at the downward end of the container. Specifically, as seen in FIGS. 4 and 6, a container 60 which has arrived at a discharge station such as the baggage claim area 46 has been inclined due to the inclination of a discharge conveyor 131, the latter being accomplished by conventional means such as tilted rollers. Alternately, the discharge conveyor can be a portion of a truncated cone. A baggage slide or apron 149 is positioned adjacent the end of the container to be opened to receive the baggage discharged from the container 60, the apron preferably being inclined at the same angle as the container. The container is guided along the inclined conveyor by rollers 150. Thus, the container will readily deliver baggage by gravity when either the solenoid 96 or the trigger 133 acts.

Door closing means are provided to close the door of the container after it has discharged its contents at such a discharge station. The door closer forces the door into the latched position. There are a number of ways of accomplishing this. With respect to the embodiment utilizing the door 68 and 68c hinged to the floor, a bar 151 can be attached to the conveyor downstream from the discharge area, the bar being shaped to provide an inclined ramp to gradually force the door of the tray to close. Although the door shown in FIG. 15 is hinged to the tray floor, the bar 151 will work as well on doors hinged to the tray side wall. In the case of the embodiment utilizing a door hinged at the side wall, the closing mechanism can be a plate 153 attached at the downstream side of the discharge station and positioned to gradually cam the door 68a closed (FIG. 12).

A variety of discharge stations can be designed to utilize the concepts of the invention, and because of this improved system can be positioned anywhere which is convenient for the intended function. FIG. 4 depicts an illustrative baggage claim area wherein two baggage call units or receptors 48 are positioned so as to be utilized simultaneously. That is, a baggage claimant inserts his baggage claim check or an equivalent code bearing element containing the identification of his baggage (such as his baggage ticket number) into the receptor or reader 48. The check is read automatically, thereby generating a coded signal which is transmitted to the computer. The container having the baggage is located by the computer and directed to the claim area 46 where the container door is opened automatically to discharge the baggage. Meanwhile, another baggage claimant may have inserted his claim check in the reader, causing other containers to be in the process of moving to the claim area 46. Since the owners are there waiting for their baggage, there is a substantially reduced risk of theft. Further, without the proper identifying claim check, the invention will not bring any baggage to the baggage claim area. Thus, the baggage is never there unless a claimant having the baggage's identification has demanded it. To further increase the use of that one discharge station, a second baggage cell unit 48 is positioned at the other side of the apron 149, thus allowing a large number of persons to make their claims and await the arrival of the baggage.

It is desirable to spread the discharge of the baggage across the width of the claim area. In the case of the triggers 133 illustrated in FIGS. 19 and 20, this is accomplished by actuating the triggers one by one progressively across the length of the apron 149. When the last one has been actuated, the sequence returns to the initial end of the apron and is repeated. In the case of the containers which are equipped to be released by a mechanism at the back of the container such as is illustrated in FIGS. 7 and 12, an indexing mechanism 200 (FIG. 25) is provided. The mechanism includes a chain 201 on which the solenoid 96 is mounted, the chain 201 being held within a track 202 (FIG. 6). The chain 201 is mounted on sprockets 203 and is driven by a sprocket 204 driven by reversible motor 205. The motor is controlled by a switching mechanism 206 which in turn is actuated by limit switches 207 and 208, the limit switches being spaced apart at the limits of travel of the solenoid 96. These limits are generally determined by the width of the apron 149. A stop 209 is mounted on the chain 201 and moves from one limit switch to the other, thereby causing the solenoid 96 to reciprocate back and forth across the width of the apron 149.

Figure 25:
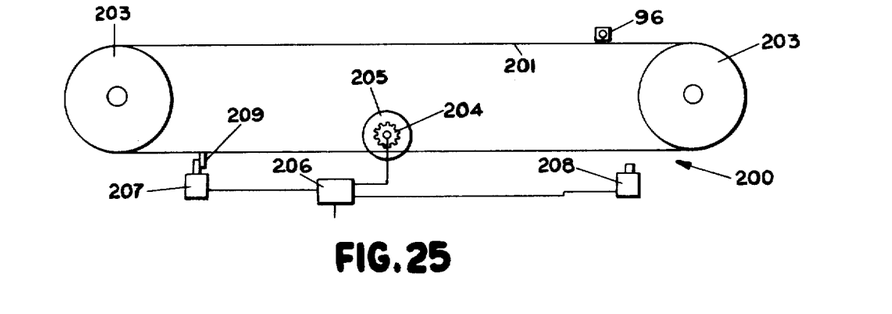
FIG. 25 is a schematic view of one form of indexing device for releasing baggage from the containers.

The mechanism can be designed to move the solenoid 98 continuously or step-by-step. Other mechanisms for effecting spaced discharge of the baggage may be utilized within the concepts of this invention.

Figure 2:
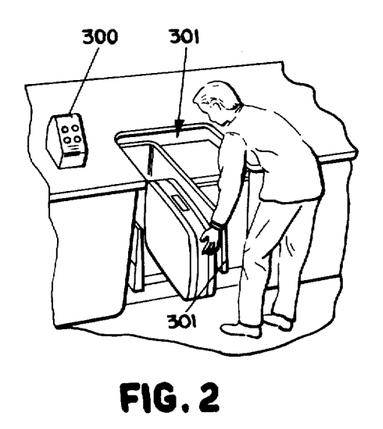
FIG. 2 is a perspective view of an unloading or loading station constituting a part of the invention.

FIG. 2 illustrates another embodiment for the discharge station, which embodiment can also serve as a loading station at the check-in area 20 with a slight modification as hereinafter described. In both cases, a code unit 300 is positioned at the station. Also in both cases, the station comprises a cabinet 301 designed to accommodate a single container 302 which container differs from the earlier containers described by lacking a door 68. A portion of the conveyor (not shown) passes through the inside of the cabinet carrying the containers therewith, the cabinet having a retractable door covering the opening through which the bag is either placed or withdrawn in either loading or unloading, respectively, the container. If the station illustrated in FIG. 2 functions as a discharge station, an actuator element similar to solenoid 96 is attached to the cabinet. When the arrival of the desired container is sensed, the actuator opens the retractable door and the baggage is withdrawn by the owner. Means can be included to temporarily halt the conveyor for a prescribed period of time upon the opening of the retractable door, and an alarm can be utilized to sound when that time is drawing to a close so that the system will automatically continue the movement of the conveyor and yet not injure the person attempting a withdrawal of baggage. It is also possible to cause the automatic ejection of the bags from the container while the door is open. On the other hand, if the station illustrated in FIG. 2 is functioning as a loading or check-in station, the door includes means for holding it permanently open so that baggage can easily be loaded as an empty container moves into position.

When the station illustrated in FIG. 2 is utilized as a check-in station, the code unit 300 has means to record the necessary information to direct the baggage to the proper flight. In the more sophisticated forms of this invention, it may also receive information concerning the specific identity of the baggage. When this same station is used as a baggage claim station the code unit is a reader which transmits to the computer the identity of the individual baggage.

Figure 3:
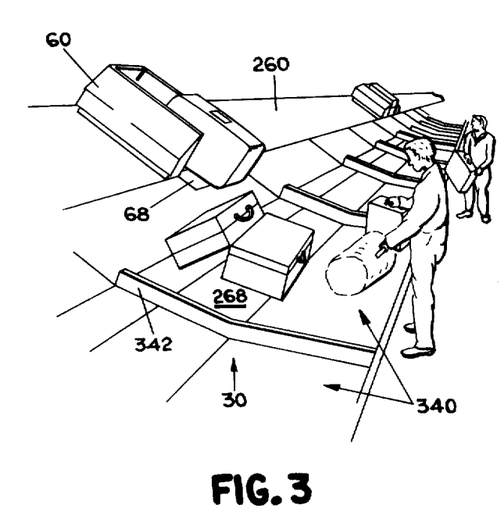
FIG. 3 is a perspective view of the baggage bin slides as would be used for loading a plane.

FIG. 3 illustrates still another embodiment of the discharge station, the station there illustrated being the sorting and dispensing station 30 for loading the plane. This station has an elongated slide or apron upon which the baggage is discharged from the containers. This apron is divided by partitions 342 in a plurality of individual bins 340 arranged side-by-side, the number being determined by the volume of baggage to be handled by the particular facility. At this station, the incoming baggage checked by departing passengers is discharged into the bins from which it is loaded on carts or other suitable vehicles and taken to the appropriate flight. How this arrangement functions within the concept of this system will be explained subsequently.

CONTROL OF THE SYSTEM

It will be readily apparent that in the more complex and sophisticated form of this invention, it will be necessary to utilize a mechanism to keep track of the contents and the location of each filled container and to compare that with the information carried by the coded signal generated by the baggage call units 48. This can be accomplished in a number of ways, the one illustrated herein utilizing a computer having conventional information storage banks and conventional means for comparing information conveyed thereto in a coded signal with the information stored in the banks.

Figure 14:
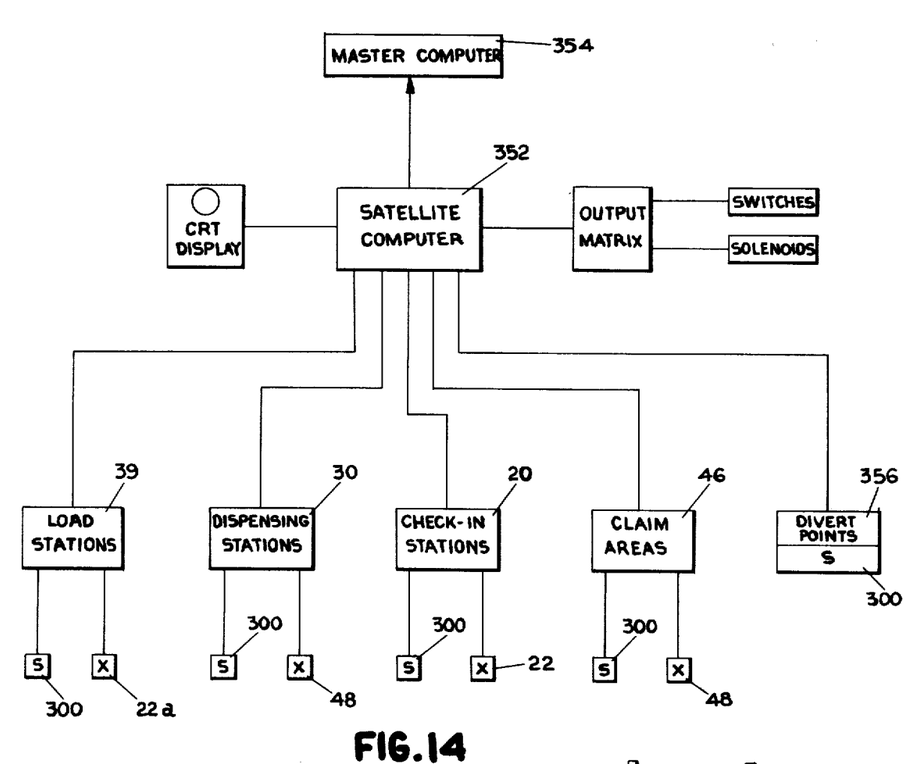
FIG. 14 is a schematic diagram illustrating the hookup of the computer system.

The computer may comprise a single computer 352 which receives all the data directly or a master computer 354 which receives data from a satellite computer 352 (FIG. 14).

The location and identity of the individual containers may be handled in several ways. One way is to assign an identification to each individual container and to feed this information into the computer. Thereafter, the computer at all times maintains an accurate memory of the location of each individual container throughout the entire system.

Another arrangement is to supply the same information to the computer and to also equip the conveyor system with readers 360 at various points along the conveyor (FIG. 1). In this case, each container is equipped with an identification plate 361 on which is impressed a code corresponding to that already supplied the computer. This code is read each time it passes a reader and this information then updates the computer's information concerning the location of the particular container.

The information on the plate 361 can be coded in any suitable manner such as magnetically, by an optical pattern as by use of different colors. The readers 361 will be of a type capable of reading the type of coding utilized.

When the readers 360 are used, one is provided at each diversion point. The diversion points include, for example, all the switching locations such, for example, as switching area 42 (FIG. 1). When a container is shuttled into the storage area 28 and onto one of the storage conveyors 32, repeated sensing is not needed inasmuch as each time a container is withdrawn from the storage conveyors 32, the container which are on the input side of that withdrawal are indexed down through the storage area, one at a time, and the indexing is conventionally registered in the computer simultaneously to indicate that the container has been moved up accordingly. When a coded signal is sent to the computer by means of a baggage call unit 48, that signal is compared with the information stored in the banks and the particular location of the container having the identical information is found from the information storage banks. If the container is then in storage, means are actuated to push the container out of the storage area 28 onto the through conveyor 29. When the container is sensed as having arrived at the appropriate bin in either the sorting and dispensing station 30 or the baggage claim area 46, of which there may be several, the computer recognizes via the adjacent sensors 360 that the contents has been called for at that particular discharge station and activates the proper trigger to discharge the contents of the container at that particular station or bin. When the baggage is so discharged, the computer memory of the identification of the baggage is erased by conventional means. For example, this could be accomplished when new baggage is installed in that particular container, the computer erasing the identification formerly given to that container number.

Figure 26:
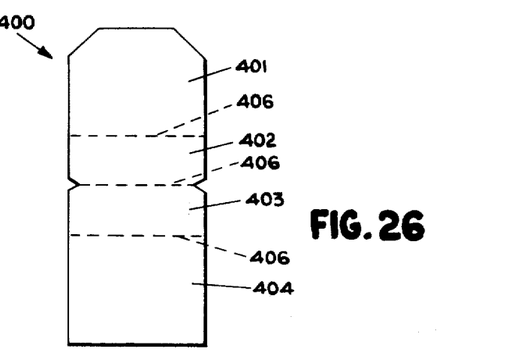
FIG. 26 illustrates a baggage claim check designed for use with one form of this invention.

In a more sophisticated form of this invention, a baggage check having several parts is created. This check 400 illustrated in FIG. 26 consists of a visual portion 401 which may be used to manually trace the bag should it for some reason become lost or the claimant lose the claim portion of the check. This check is given a specific identification code either before or at the time of check in. This code is impressed upon both of the coupons 402 and 403. The various portions of the claim check may be separated from each other along lines such as a perforation line 406. At check-in, the baggage is equipped with one of the checks 400 which is then divided with the visual portion 401 and the coupon 402 remaining with the bag and the visual portion 404 and the coupon 403 retained by the passenger or claimant. The flight number is then supplied the computer through the code unit in the same manner as has been previously described.

When the baggage is received at the airport where it is to be reclaimed, the operator loads the bag on one of the containers, removes the coupon 402 and drops it into a reader. The reader transmits the coded identification of the bag to the computer which stores this information until the baggage is called for by the passenger. The passenger claims his baggage by inserting the coupon 403 in the reader 48 at the claim station. The signal generated by the reader instructs the computer to forward the container having his baggage and to cause it to be discharged at that particular claim station.

The information can be coded on the coupons in any suitable manner such as magnetically or, for example, by a particular hole pattern punched through the coupons. It will be recognized that additional coupons may be incorporated into the claim check to travel with the baggage to effect partial or total automation of the in-transit transfer of the baggage from one airline to another.

Figure 27:
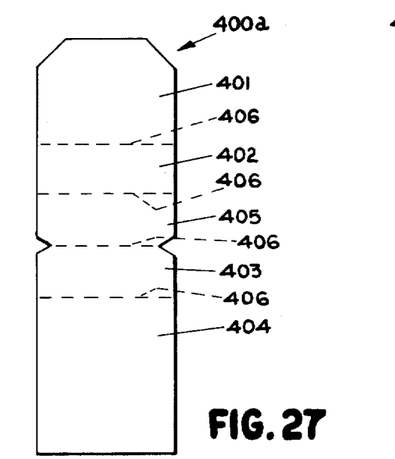
FIG. 27 illustrates a modification of the baggage claim check shown in FIG. 26.

To effect this a baggage check 400a having visual portions 401 and 404 and coupons 402 and 403 is provided (FIG. 27). This check in addition has one or more in-transit coupons 405 which remain with the baggage. If more than one inter-line transfer is required, additional coupons may be provided with the transfer information arranged coupon by coupon in the order in which the transefers are to be effected.

While it is unlikely that any airport will for some time be equipped with inter-line baggage transfer conveyors, the use of an in-transit coupon has significant advantages. The operator loading baggage from a plane on the conveyor does not have to determine whether the baggage is destined for another flight or for claim at this airport. He merely uses the first in remaining coupon. If this is an inter-line or in-transit coupon, it will automatically route the baggage to a station specifically assigned to baggage to be transferred to other lines. Thus, the system will automatically distinguish between in-transit and terminating baggage.

Since many of the smaller airports will not be equipped with the baggage claiming equipment required by this system, the visual portion may be used by the passenger to identify and claim his baggage. This arrangement when used in a fully equipped airport eliminates the possibility of improper encoding of the baggage claim system by the operator receiving the baggage from the plane and placing it in the containers.

Whether or not the baggage identification system shown in FIG. 27 is utilized, it will be necessary to transfer the baggage checked by a passenger from the containers to the flight which is to transport it. This transfer is effected at the station illustrated in FIG. 3. In any airport having sufficient baggage handling volume to warrant the use of the type of system contemplated by this invention, the handling of the baggage will be under the control of a baggage master. When flight time approaches, he will designate one of the bins 340 as the bin to receive all baggage for that particular departing flight. This information will be supplied to a control member which may be a computer and to the operator responsible for doing the actual work. The control member or computer will then direct all containers which have been identified as containing baggage for that particular flight to the particular bin 340 selected for that flight. The control member or computer will cause the containers to discharge all baggage destined for that flight into that bin. This eliminates operator error since the operator is not concerned with identification of the baggage. By the simple fact that it is discharged into the particular bin, he knows which flight is to receive it.

SIMPLIFIED SYSTEM

Figure 21:
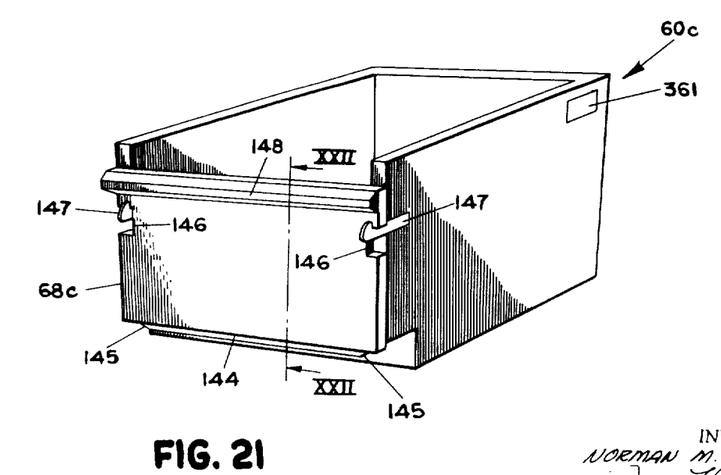
FIG. 21 is a perspective view of a container having a modified door mounting.
Figure 22:
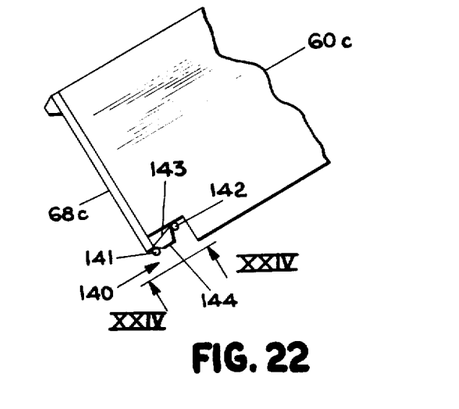
FIG. 22 is a fragmentary sectional view taken along the plane XXII—XXII of FIG. 21 showing the door in closed and latched position.
Figure 23:
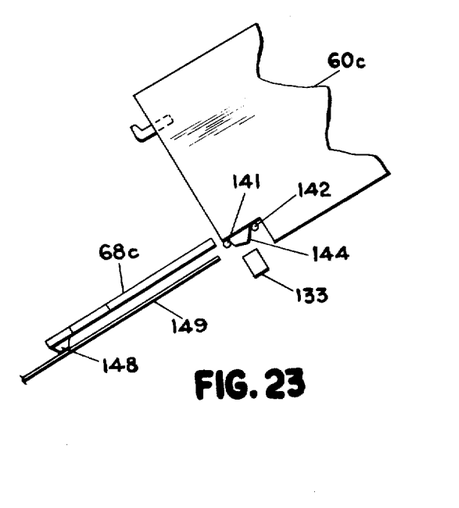
FIG. 23 is a view identical to FIG. 22 but showing the door just after it has been released to open.
Figure 24:
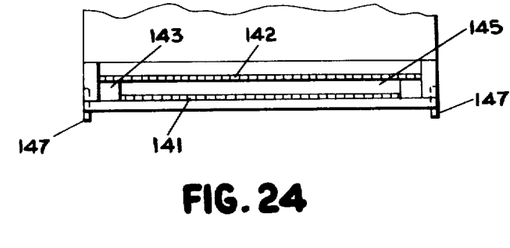
FIG. 24 is a fragmentary bottom view of the hinge structure taken along the plane XXIV—XXIV of FIG. 22.
Figure 31:
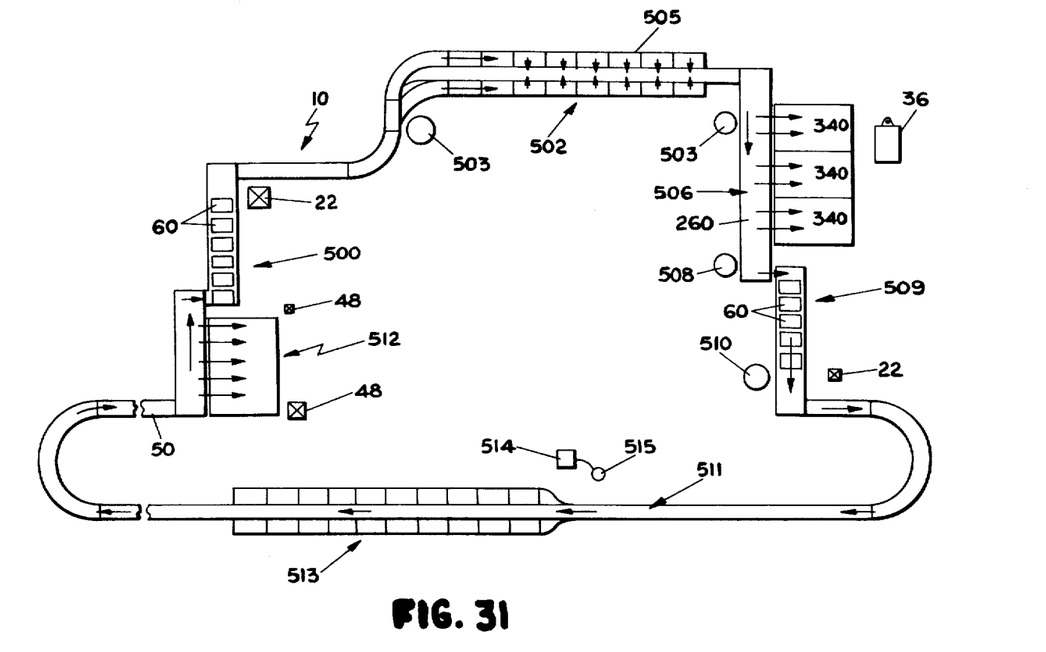
FIG. 31 is a schematic diagram of a modified floor plan layout of a baggage system incorporating this invention.

FIG. 31 illustrates a much simplified baggage handling system employing this invention in which the necessity of a computer is eliminated. In this arrangement, the baggage is checked in at a baggage check station 500. At this station, it is placed in one or more containers and a code is imposed upon the container in any suitable manner such as magnetically. For this purpose, a code carrying plate 361 may be mounted at any suitable point on the container (FIG. 21). This code identifies the flight which is to receive the baggage.

The loaded container is then transported to the outbound baggage storage area 502. As the container enters this area, its code is read by a reader 503. The reader passes its information to a selector 504 (FIG. 14A) which may be mechanical or electronic. Based on information which has previously been supplied to the selector by the baggage master, the selector either permits the container to pass through the storage area or directs it to be placed in one of storage cells 505 arranged along the conveyor in the storage area 502. If the baggage is identified as destined for a flight which is then ready to load, the container passes through the storage area directly to the flight loading discharge area 506. However, if no bin 340 has as yet been designated to receive the baggage, the container will be shunted into one of the storage cells or receiving elements 505.

In a preferred arrangement, the first containers arriving at the storage area 502 which are to be held in storage are shunted into the cell or receiving element nearest the outbound flight loading area 506. As subsequent containers arrive, they will be moved to occupy the next adjacent cells in progression away from the flight loading area in the order in which they arrive at the storage area. As they enter the storage area, the reader will identify and with this information the selector will store the information concerning the cell to which they have been shunted. Later, when the flight for which they are identified is called for, the selector will be activated and starting with the container nearest the flight loading station 506, will withdraw them one by one from their storage cells and return them to the conveyor. As each container is removed, all the remaining containers further from the flight loading station will be moved one storage cell toward the flight loading station and the selector will log this fact. This will continue until all containers having baggage destined for the particular flight have been removed from storage.

Figure 14A:
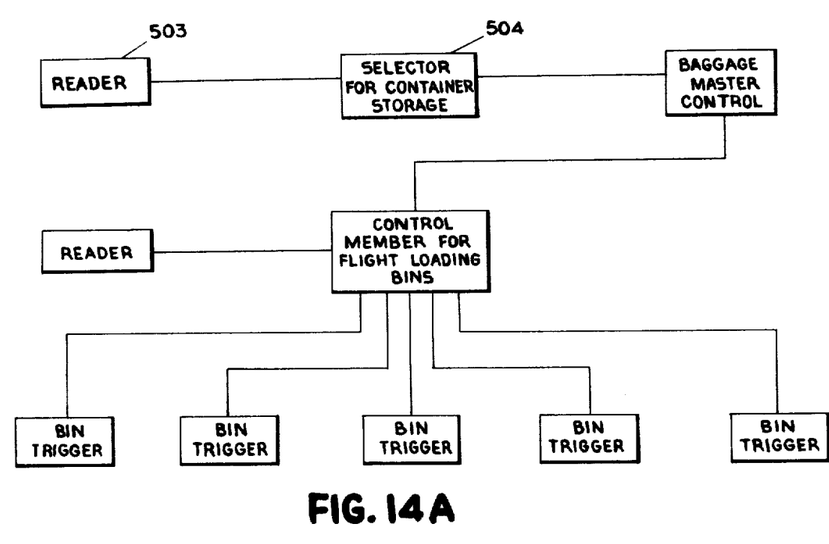
FIG. 14A is a schematic diagram of a control system applied to a conveyor system incorporating this invention designed only to handle baggage from check-in station to an outbound flight loading station.

At the entrance to the flight loading station, a reader 503 is provided which reads the coded information on the container and passes this information to a control member. When the container reaches the bin 340 to which the baggage is assigned, the control member will cause the container to discharge. This can be done by conventional mechanical or electronic means, the containers as they pass the bins being kept track of in a step-by-step fashion. Once again, the operator removing the baggage from the individual bins and loading it on the carts 36 does not have to identify its destination since the system will deliver to him only baggage destined for one particular flight. This system is schematically illustrated in FIG. 14A.

As the empty containers leave the flight loading station 506, the coded information on the code plate 361 can be wiped by suitable means such as the wiper unit 508. This function, of course, can be combined with that of the next encoded.

The empty containers then proceed to the inbound baggage receiving station 509 where they are once again loaded and, if necessary, recorded by the encoder 510. The information is supplied the encoder by an operator through the information he puts into the dispatching unit 22. Some type of conventional container accumulation area may be provided between the flight loading station 506 and the inbound baggage receiving station 509 to provide a temporary empty container holding area when there is a significant disparity between the number of containers being unloaded at station 506 and the number of containers needed at station 510 and the container supply for station 500 is adequate. Such an accumulation area may be provided elsewhere along the system.

Figure 14B:
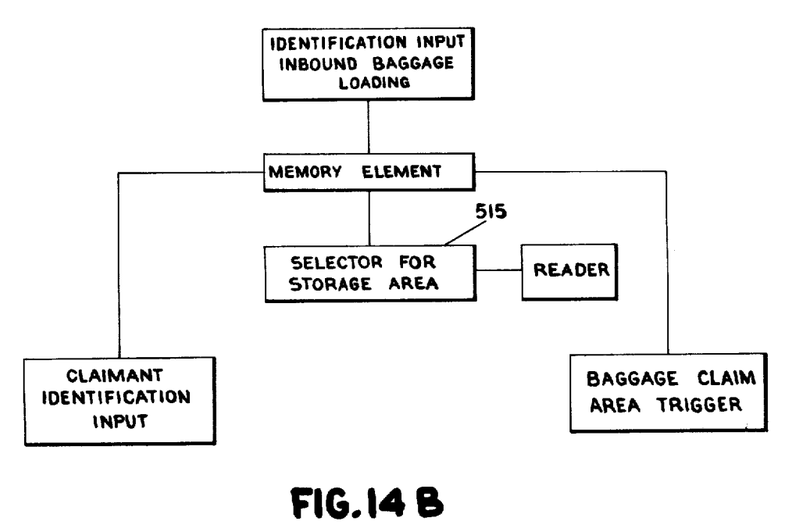
FIG. 14B is a schematic diagram of a control system applied to a conveyor system incorporating this invention designed only to handle baggage from an inbound flight unloading station to a baggage claim station.

Along the conveyor line 511 connecting the inbound baggage loading station 509 and the passenger baggage claim area 512 another storage area 513 may be provided to hold baggage which has been received but should not yet be delivered to the baggage claim station. If the system does not incorporate means whereby the baggage is to be brought to the claim station only upon demand of the passenger, the storage facility 513 is not normally necessary. However, if it does have the passenger demand feature, this storage area 513 is necessary to accumulate and hold the loaded containers until they are demanded. When such a system is used, the operator at the inbound station 509 will encode each container with the specific identification of the container's contents and thus will be transmitted to a memory element and also read by the reader 514 as the container enters the storage area 513. Thereafter, the container will be shunted to a specific storage cell or receiving element with the information as to the container's location and contents identity being retained by a selector 515. When the passenger inserts the identification code in the reader 48 at the claim station, the selector upon signal from the memory element will cause the proper container to be withdrawn from storage and sent to the claim station. It will also, if required, prepare the claim station to discharge the baggage on the proper location adjacent the claimant. This arrangement is schematically illustrated in FIG. 14B.

It will be recognized that the principles of this invention can be practiced in a system which is designed only to handle baggage from the check-in station to the outbound flight loading station with an entirely different system being employed for inbound flight baggage. By the same token, such a system can be limited to movement of inbound baggage from the inbound loading station to the claim station with an entirely different system being employed for outbound baggage.

It will also be recognized that many types of conveyors and conveyor components may be used to execute the principles of this invention. There are various control systems which may be used varying widely both in type and degree of sophistication. The specific details of these systems and of the conveyors themselves are not part of this invention.

Other modifications will be apparent to one skilled in the art, such as the use of additional storage areas to relieve the load on storage area 28 in the event it is desired to confine storage area 28 to accommodate essentially only the total number of flights capable of departing or arriving at the airport at any one time. Accordingly, it is intended that the invention cover all equivalents, modifications, and alternate arrangements as may be within the scope of the following claims.

The embodiments of the invention in which an exclusive property or privilege is claimed are defined as follows:

1. In a conveyor system for baggage having a plurality of baggage containers and conveying means for transporting said containers, said conveyor system having at least one discharge station, the improvement comprising: receiving means at said discharge station for receiving a coded signal; means in said system for identifying automatically the contents of each individual container; means operatively connected to said receiving means for comparing the signal with the information obtained by said identifying means; and at least one actuator element associated with said conveyor for selectively causing said container to discharge its contents at said station in response to a finding by said comparing means of compatability between the signal and the identifying information.

2. The improved baggage conveyor system as defined in claim 1, and further including means for coding said container as containing new contents, said coding means being operatively associated with a loading station wherein baggage is first inserted into empty containers; and means for transporting said containers from said discharge station to said loading station.

3. The improved baggage conveyor system as defined in claim 2, wherein said identifying means and said coding means include a computer-like information storage bank.

4. The improved baggage conveyor system as defined in claim 2, wherein said discharge station and said loading station each comprise a cabinet designed to accommodate a single container at a time, a portion of said conveying means passing through the inside of said cabinet, said cabinet having a retractable door thereon, and said actuator element is operatively connected to said door to open the same upon the finding of said compatability of said information.

5. The improved baggage conveyor system as defined in claim 4, wherein said actuator element is attached to said cabinet, and said door includes means for holding it open in the event the cabinet is functioning as a loading station.

6. The improved baggage conveyor as defined in claim 1, wherein said identifying means includes a computer-like information storage bank.

7. The improved baggage conveyor system as defined in claim 1, and further including means for locating the container bearing the contents identified in said signal.

8. The improved baggage conveyor system as defined in claim 7, wherein said locating means includes a computer-like information storage bank.

9. The improved baggage conveyor system as defined in claim 7, and further including means for storing said containers with their contents therein, said locating means being directed at least to said storing means in order to locate the pertinent container.

10. The improved baggage conveyor system as defined in claim 9, and further including means for retrieving said containers from said storage means upon the finding by said comparing means of said compatability.

11. The improved baggage conveyor system as defined in claim 10, and further including means for indexing the remaining of said containers one position at a time through said storing means as said retrieved containers are withdrawn.

12. The improved baggage conveyor system as defined in claim 1, wherein said comparing means is a computer.

13. The improved baggage conveyor system as defined in claim 1, wherein each of said containers is a five-sided open-topped tray with a door at at least one end.

14. The improved baggage conveyor system as defined in claim 13, wherein said five sides include two generally vertical sides, a floor and said door, the latter being hinged to one of said two sides.

15. The improved baggage conveyor system as defined in claim 13, wherein said five sides include two generally vertical sides, a floor, and said door, and further including means hingedly mounting said door to said floor in a manner permitting vertical reciprocation of said door with respect to said floor, and means for opening said door only when said door is raised vertically with respect to said floor.

16. The improved baggage conveyor system defined in claim 1 wherein said hinge means has two spaced hinges one secured to the floor and the other to said door; a lever element pivotally mounted to said one hinge and extending beneath said other hinge; said means for opening said door being an actuator cam for engaging and lifting said lever element, the lever element when raised lifting said door to release position.

17. The improved baggage conveyor system defined in claim 15 wherein said hinge means has two spaced hinges and a downwardly projecting wedge member connected to and between said hinges; said means for opening said door being an actuator cam for engaging and lifting said wedge member, the wedge member when raised lifting said door to release position.

18. The improved baggage conveyor system defined in claim 1 wherein said hinge means has two spaced hinges one secured to the floor and the other to said door; a rocker cam and means rotatably mounting said rocker cam on said container beneath said other of said hinges; said rocker cam having a pair of oppositely projecting wings one on each mounting means and a depending finger; said mounting means being adjacent the upper edge of said rocker cam; said means for opening said door being an actuator cam for engaging said finger and rotating said cam about its mounting means urging one of said ears to lift said door to release position.

19. The improved baggage conveyor system as defined in claim 13, wherein said actuator element is positioned to open said door on command by raising the same with respect to said floor, and further including means causing said actuator element to open said each container at a location spaced from adjacent positions at said discharge station to which are delivered the contents of other of said containers.

20. The improved baggage conveyor system as defined in claim 19, and further including means for closing said door when said container leaves this discharge station.

21. The improved baggage conveyor system as defined in claim 19, wherein said causing means includes means for indexing said actuator along the length of said discharge station.

22. The improved baggage conveyor as defined in claim 1, and further including at least a second additional actuator element at said discharge station adjacent to said one element, each of said actuator elements being positioned to discharge any of said containers into a selected area of said station, said receiving means including means for assigning the contents of each container to only a specific one of said areas of said station, and means associated with said identifying means for activating only one of said actuator elements which corresponds to said specific one of said areas to which said container contents have been assigned, whereby only said corresponding actuator element discharges the container contents assigned to said one area.

23. The improved baggage conveyor system as defined in claim 22, wherein said indexing means includes a chain on which said actuator is mounted, a prime mover for driving said chain and means associated therewith for limiting the movement of the same.

24. The improved baggage conveyor system as defined in claim 23, wherein said limiting means includes a stop mounted on said chain and two limit switches spaced apart at the limits of the desired movement of said actuator.

25. In a system for delivering baggage to its claimant at a discharge station, a conveyor and a plurality of individual baggage transport trays each having only the baggage of a single claimant, the improvement in said system comprising: memory means associated with said conveyor for receiving and storing signals identifying the contents of each individual tray; a reader at said discharge station for receiving a coded identification and actuation means at said discharge station for causing the discharge of baggage from a tray; said memory means associated with both said reader and said actuation means for translating the coded identification received by said reader into identification of the tray having the claimant's baggage.

26. In a system for transporting and identifying checked articles, a receiving station and a discharge station, a conveyor connecting the same having a plurality of article transport trays, each trays being permanent identified; memory means associated with said conveyor maintaining as information at all times the identity and location on the conveyor of each individual tray; an information receiver at said receiving station for receiving the coded identity of the contents of each tray and storage means associated with said system for retrievably storing such information; an information receiver at said discharge station for receiving coded information and means for comparing the coded information so received with the coded identity in said storage means; signal generating and transmitting means activated by said comparing means upon finding compatibility of the coded information from the discharge station with the coded identity in said storage means for transmitting a signal to said memory means; discharge means at said discharge station activated by said memory means to cause the article to be discharge from its tray.

27. In a system for airports for receiving baggage as it is checked in by passengers and delivering it to a designated flight loading station having a conveyor for transporting the baggage between the check-in and flight loading stations, said conveyor having individual baggage transporting containers movable therealong, the improvement comprising: means for identifying each container on the basis of its contents; said conveyor passing through said flight loading station and at said flight loading station being inclined; means dividing said flight loading station into a plurality of sections, a trigger element at each of said sections shiftable between retracted and actuated attitude, said trigger element when actuated engaging a container to cause it to discharge its contents through one end into the section with which said trigger element is associated; a control member connected to each of said trigger elements having means for selecting said trigger elements in response to the identity given each of said containers.

28. In the system described in claim 27 wherein said selecting means of said control member has a discrimination unit for simultaneously activating the trigger elements of a plurality of said sections in response to the identity given each individual one of a plurality of said containers.

29. In the system described in claim 27 wherein said conveyor has a container storage between said check-in and flight loading stations; a selector at said container storage for determining whether the contents of each container entering the container storage is then receivable by one of said sections of said flight loading station; a plurality of container receiving elements in said container storage and shunt means for transferring individual containers to and from said receiving elements, said shunt means being connected responsive to said selector and shunting those containers into said receiving elements which are not currently receivable at said flight loading station and returning them to the conveyor upon said selector receiving a signal that the containers are receivable at the flight loading station.

30. The system described in claim 29 in which the selector has means for discriminating between containers based upon the identification of their contents.

31. The system described in claim 29 in which said receiving elements are arranged in a side-by-side pattern and transfer means for shifting all of the containers in said receiving elements toward one end of the container storage in response to the withdrawal of a container from a receiving element from among a group of container occupied receiving elements; said selector having a memory element for recording the position of each of the containers in said receiving elements as they progress from one receiving element to an adjacent one.

32. The system described in claim 27 wherein said system has a computer-like member and both said control member and said container identifying means are connected thereto and controlled thereby; said computer-like member being the memory component of said system.

33. The system described in claim 27 wherein said means for identifying containers is a code carrying member mounted on each individual container; a reader at flight loading station for reading said code carrying member, said reader being connected to said control member and said control member being responsive thereto.

34. The system described in claim 29 wherein said means for identifying containers is a code carrying member mounted on each individual container; a reader at said container storage and flight loading station for reading said code carrying member, said reader at said container storage being connected to said selector and said selector being responsive thereto; said reader at said flight loading station being connected to said control member and said control member being responsive thereto.

* * * * *